No. 760,078. PATENTED MAY 17, 1904.
W. McGHIE.
SAW SET.
APPLICATION FILED FEB. 28, 1903.
NO MODEL.

Witnesses
E. F. Stewart
C. N. Woodward

William McGhie, Inventor:
by C. A. Snow & Co.
Attorneys

THE NORRIS PETERS CO., PHOTO-LITHO., WASHINGTON, D. C.

No. 760,078. Patented May 17, 1904.

UNITED STATES PATENT OFFICE.

WILLIAM McGHIE, OF LIVEOAK, FLORIDA.

SAW-SET.

SPECIFICATION forming part of Letters Patent No. 760,078, dated May 17, 1904.

Application filed February 28, 1903. Serial No. 145,594. (No model.)

*To all whom it may concern:*

Be it known that I, WILLIAM McGHIE, a citizen of the United States, residing at Liveoak, in the county of Suwanee and State of Florida, have invented a new and useful Saw-Set, of which the following is a specification.

This invention relates to devices for "setting" saws, and has for its object to improve and simplify devices of this character and to increase their efficiency without increasing the weight or expense; and the invention consists in certain novel features of the construction, as hereinafter shown and described, and specified in the claims.

Figure 1:
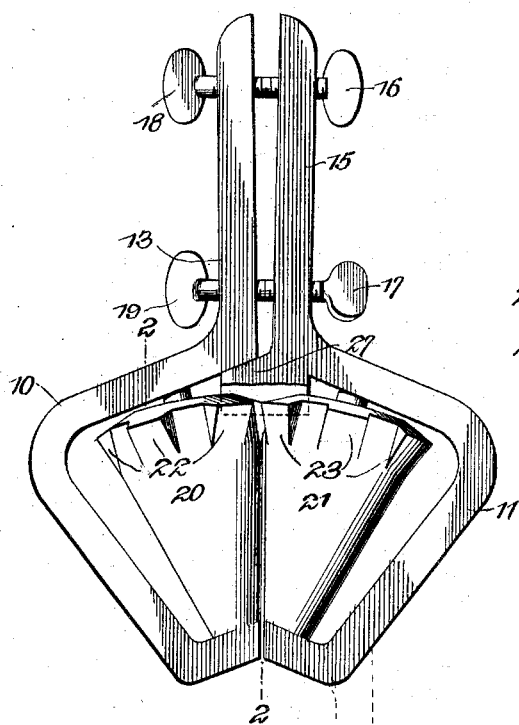
Figure 2:
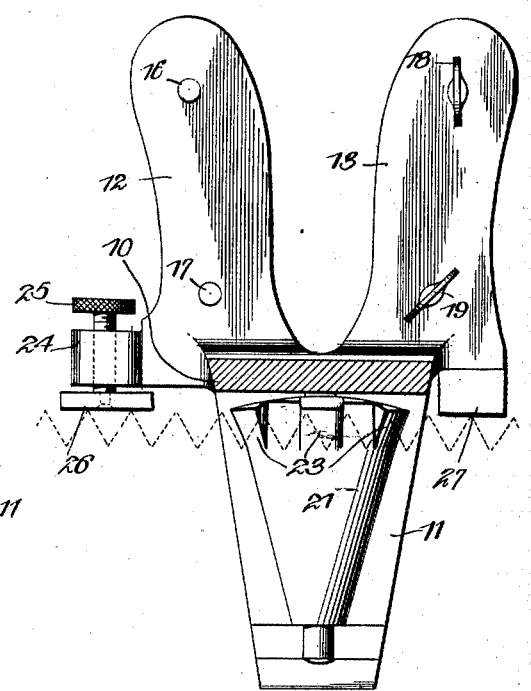
Figure 4:
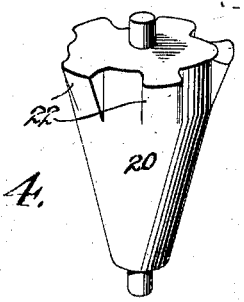
Figure 3:
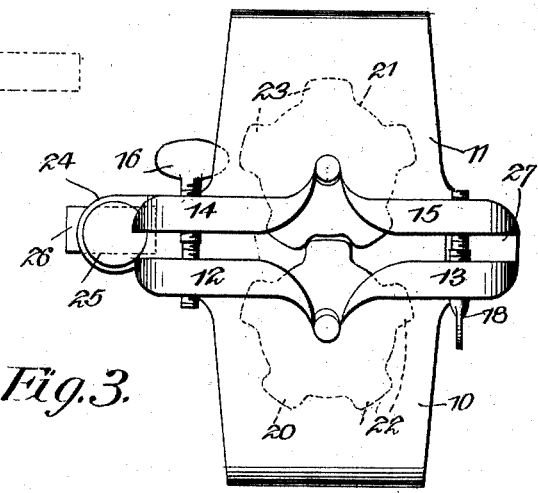

In the drawings illustrative of the invention, in which corresponding parts are denoted by like designating characters, Figure 1 is an end elevation. Fig. 2 is a front elevation in section on the line 2 2 of Fig. 1. Fig. 3 is a plan view. Fig. 4 is a perspective view of one of the setting-rollers detached.

The improved device consists of a supporting-frame formed in two parts 10 11, with their lower ends extending inwardly and provided with bearings for one end of the setting-rollers and the upper ends likewise extending inwardly and provided with bearings for the opposite ends of the setting-rolls and also provided with spaced upwardly-extending arms 12 13 14 15, as shown. The arms 12 14 are connected by adjusting-screws 16 17 and the arms 13 15 similarly connected by adjusting-screws 18 19 by which means the frame-sections may be adjusted nearer to and farther from each other, as required. The opposing rollers are represented at 20 21 and are preferably conical, with journals engaging the bearings in the frame-sections 10 11 and with spaced interengaging teeth 22 23 protruding from the larger ends, as shown. The distances between the teeth will correspond to the "pitch" of the teeth of the saw to be operated on, and different sets of rollers will be provided having the pitch of their teeth 22 23 corresponding to the pitch of the teeth of the saws upon which they are to operate, the adjusting-screws 16 17 18 19 providing for the proper adjustment of the frame-sections to enable the rollers of the different sizes to be inserted.

Extending from one of the frame-sections is a stud 24, having an adjusting-screw 25 operating therein, the screw having an extended guard 26, adapted to rest upon the points of the teeth of the saw, and thus serve as a gage to regulate the amount of the set supplied to the saw-teeth. At the opposite side of the device from the gage one of the frame-sections is formed with a lip 27, extending beneath the adjacent portion of the opposite frame-section, as shown, and serving to maintain the section in proper relative position during the adjustments by the screws 16, 17, 18, and 19 and also coacting with the gage member 26.

In operating the device the rollers having teeth corresponding to the pitch of the teeth of the saw to be "set" are placed in the frame-sections and the latter adjusted until the distance between the smooth portions of the rollers corresponds to the thickness of the saw-blade. The device is then forcibly moved over the saw with the gage 26 resting upon the points of the saw-teeth, which action will cause the interengaging teeth of the rollers to produce the requisite set in the saw-teeth, as will be obvious. It will be evident that the nearer the roots of the saw-teeth the teeth on the rollers operate the greater will be the amount of the set. Hence by adjusting the gage 26 the saw may be caused to move with the roots of its teeth at any desired point relative to the teeth of the rollers. Hence the set may be perfectly controlled by adjusting the "gage."

The different-sized rollers may be very easily inserted and removed, so that the device may be very quickly changed to adapt it to operate upon saws having a different pitch to the teeth.

The whole device is very simple and can be constructed at small expense and will be found a very efficient implement for the purpose denoted. It may be adapted to all sizes of saws, and when employed upon band-saws one of the frame-sections will preferably be provided with a foot or standard, (indicated at 28,) by which it may be mounted upon a stationary support, so that the saw may be drawn through the setting-rollers instead of the rollers being drawn over the saw; but this would not be a departure from the principle of the invention, as the results and mode of operation would be the same. The smooth portions of the rollers perform an important function, as they serve to guide and steady the saw and cause the interengaging teeth to perform their work with great regularity and uniformity and prevent all tendency of rollers to become displaced or jump from their bearings.

Having thus described the invention, what I claim is—

1. A saw-set comprising a supporting-frame divided longitudinally into separate sections, a plurality of pairs of adjusting-screws connecting said sections and a pair of oppositely-disposed rollers supported one in each of said frame-sections, said rollers presenting smooth surfaces throughout the greater portion of their length and having adjacent portions of said smooth surfaces parallel and having alternating spaced interengaging teeth protruding from their upper ends, substantially as described.

2. A saw-set comprising a supporting-frame divided longitudinally in separate sections, means for adjusting said sections toward and from each other, a pair of oppositely-disposed rollers supported one in each of said frame-sections, said rollers presenting at their upper ends alternating spaced interengaging teeth, a lip on one of the frame members extending across the space between the rollers, and a gage also mounted on one of the frame members and adjustable in the plane between the rollers.

3. A saw-set comprising a supporting-frame divided longitudinally into separate sections adjustable toward and from each other and each provided with a pair of notches suitably arranged to form bearings for a roller having journals at the ends thereof, a pair of rollers rotatably mounted in said notches and presenting at their upper ends alternating spaced interengaging teeth.

4. A saw-set comprising a supporting-frame divided longitudinally into separate sections, means for adjusting said sections toward and from each other, and a pair of oppositely-disposed rollers presenting at their upper ends alternating spaced interengaging teeth, said rollers being journaled in said frame-sections and so arranged that the inner surface of each roller is flush with the inner end of the frame-section immediately below it.

In testimony that I claim the foregoing as my own I have hereto affixed my signature in the presence of two witnesses.

WM. McGHIE.

Witnesses:
M. E. BROOME,
J. B. JOHNSON.